United States Patent
Selk, II et al.

(10) Patent No.: US 6,885,313 B2
(45) Date of Patent: Apr. 26, 2005

(54) GRAPHICAL DISPLAY FOR AIRCRAFT NAVIGATION

(75) Inventors: Louis G. Selk, II, Phoenix, AZ (US); Thomas G. Frazier, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 49 days.

(21) Appl. No.: 10/400,941

(22) Filed: Mar. 26, 2003

(65) Prior Publication Data

US 2004/0189492 A1 Sep. 30, 2004

(51) Int. Cl.$^7$ .............................................. G08B 21/00
(52) U.S. Cl. ...................... 340/945; 340/963; 340/971; 340/973; 340/979; 701/14
(58) Field of Search ................................ 340/945, 961, 340/963, 964, 967, 971, 973, 979; 701/9, 14

(56) References Cited

U.S. PATENT DOCUMENTS

| | | | | |
|---|---|---|---|---|
| 4,175,285 A | * | 11/1979 | Dansac et al. | 701/223 |
| 4,283,705 A | * | 8/1981 | James et al. | 340/973 |
| 4,326,189 A | * | 4/1982 | Crane | 340/973 |
| 4,860,007 A | * | 8/1989 | Konicke et al. | 340/973 |
| 5,086,396 A | * | 2/1992 | Waruszewski, Jr. | 701/221 |
| 5,359,890 A | | 11/1994 | Fulton et al. | |
| 5,412,382 A | | 5/1995 | Leard et al. | |
| 5,448,233 A | * | 9/1995 | Saban et al. | 340/963 |
| 5,675,327 A | * | 10/1997 | Coirier et al. | 340/973 |
| 6,111,525 A | * | 8/2000 | Berlioz et al. | 340/971 |
| 6,111,526 A | * | 8/2000 | Aymeric et al. | 340/972 |
| 6,118,385 A | | 9/2000 | Leard et al. | |
| 6,178,379 B1 | | 1/2001 | Dwyer | |
| 6,452,511 B1 | * | 9/2002 | Kelly et al. | 340/970 |
| 6,571,155 B2 | * | 5/2003 | Carriker et al. | 701/3 |
| 6,690,296 B2 | * | 2/2004 | Corwin et al. | 340/961 |
| 2003/0034901 A1 | * | 2/2003 | Griffin, III | 340/945 |
| 2003/0193410 A1 | * | 10/2003 | Chen et al. | 340/971 |
| 2003/0206120 A1 | * | 11/2003 | Ishihara et al. | 340/970 |

FOREIGN PATENT DOCUMENTS

| | | |
|---|---|---|
| EP | 0381178 A | 8/1990 |
| EP | 1273987 A | 1/2003 |
| EP | 1273987 A2 | 8/2003 |

\* cited by examiner

*Primary Examiner*—Benjamin Lee (57) ABSTRACT

Methods and apparatus are provided for indicating safe or potentially hazardous operating conditions of an aircraft in a required navigational performance (RNP) environment. The apparatus comprises a course deviation display field with first and second markers defining outer boundaries of the RNP width and a central marker indicating the desired course within the RNP width, an aircraft estimated position uncertainty (EPU) marker in the display field whose size corresponds to the EPU relative to the RNP and a current aircraft position marker coupled to the EPU marker and moving therewith as the aircraft position changes with respect to the RNP width. The display desirably changes color and/or flashes to alert a pilot to a potentially hazardous condition when an outer boundary of the EPU marker approaches to within a predetermined guard-band distance of or overlaps either of the first or second markers. An audible warning can be included.

18 Claims, 6 Drawing Sheets

PRIOR ART

GRAPHICAL DISPLAY FOR AIRCRAFT NAVIGATION

FIELD OF THE INVENTION

The present invention generally relates to electronic instrumentation such as flight control instrumentation, and more particularly to displays providing improved presentation of course deviation, position uncertainty and potential hazard warnings in a required navigation performance (RNP) environment.

BACKGROUND OF THE INVENTION

Figure 1:
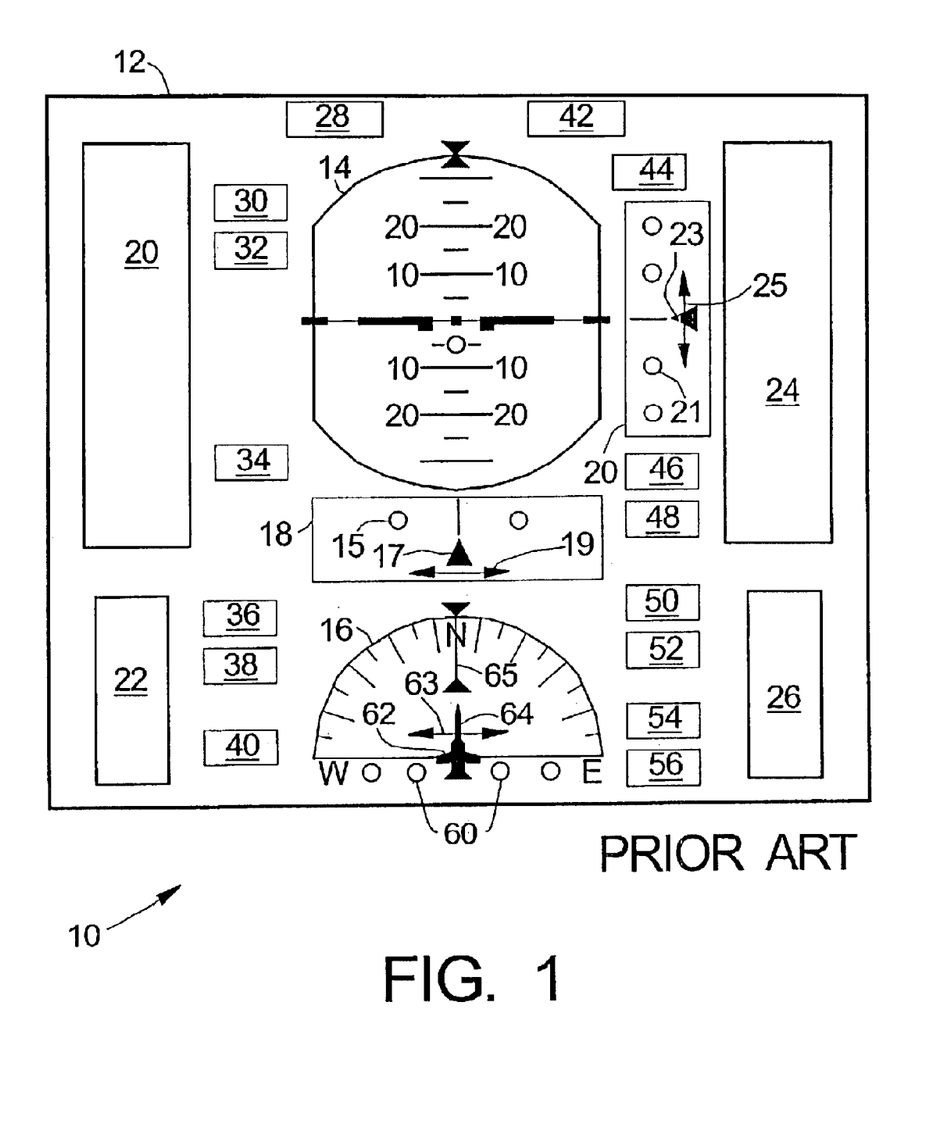
FIG. 1 is a simplified schematic representation of a Primary Flight Display (PFD) screen according to the prior art.

Effective flight management is closely related to providing accurate and timely information to the pilot. This should be done in a manner that succinctly but accurately conveys to the pilot information important to the safe operation of the aircraft. United States Patents or Patent Applications U.S. Pat. Nos. 5,359,890, 5,412,383, 6,118,385, 6,178,379 and U.S.-2003004619 describe various primary avionics systems including flight display systems and related apparatus. A principal flight instrumentation display is the Primary Flight Display (PFD) on which is shown information about course, speed, altitude, rate of climb and other information. The PFD is usually an electronic display such as a cathode ray tube or back-lit liquid crystal display. FIG. 1 is a simplified schematic example of prior art PFD 10 with electronically driven screen 12. PFD 10 and screen 12 present a variety of flight information. The content of each portion of the display is constrained, that is, specific areas of the display should be used for specific information. This is to simplify pilot training, enhance operational safety and provide for a degree of commonality among the displays in different aircraft.

For example: attitude indicator (AI) 14 located in the upper center shows turn and bank, nose-up, nose down; compass rose (CR) 16 located in the lower center provides course information; course deviation indicator (CDI) or expanded localizer indicator (ELI) 18 located between AI 14 and CR 16 shows lateral deviation from a planned course and Vertical Deviation Indicator VDI 20 located to the immediate right of AI 14 shows vertical deviation from the planned vertical path. CDI 18 has deviation marks (circles) 15 and position indicator (triangle) 17 that moves (as shown by arrows 19) relative to deviation marks 15 in response to deviations from a preplanned or required lateral flight path. Similarly, VDI 20 has elevation marks (circles) 21 and altitude position indicator 23 that moves (as shown by arrows 25) relative to elevation marks 21 in response to deviations from a preplanned or required vertical flight path profile. The spacing of the circular marks in CDI displays 18, 20 represent an angular deviation relative to a beam center of a localizer. The amount of actual course deviation needed to produce one marker displacement of position indicators 17, 23 in the directions of arrows 19, 25 is determined by minimum sensitivity requirements specified as a range or minimum by certification or industry standards scale of the indicator. A variety of other information is also presented on PFD 10 located around these required displays. For example, airspeed is generally shown in location 20, angle of attack in location 22, altitude in location 24 and vertical speed in location 26. Various other information is presented in locations 28–56, as for example, legends such as FMS1 (flight management system—one), ADF1 (automatic direction finder—one), VOR2 (omni-range beacon—two), etc. These legends may be turned on or off as the flight progresses.

One of the limitations of prior art PFDs is that they do not provide sufficient navigation information to the pilot when the plane is in highly restricted airspace or if they provide such information it is not presented in an easily comprehended way that relates to most pilot's previous experience. Restricted airspace often occurs under Category I and Category II instrument landing system (ILS) approach conditions. Category II is more restricted than Category I. What is needed, among other things, is presentation of the Required Navigation Performance (RNP) data associated with such restricted airspace, compared to the Estimated Position Uncertainty (EPU) of the aircraft. RNP is defined as [see ICAO Doc. 9613]: A statement of the navigation performance accuracy necessary for operation within a defined airspace. EPU is defined as [see RTCA SC-181/EUROCAE WG-13]: A measure based on a defined scale in nautical miles or kilometers which conveys the current position estimation performance.

Because of the already crowded and busy nature of the PFD screen, it is difficult to add new information in a manner that can be easily and quickly grasped by the pilot. In general, the new information almost always has to be placed in an already defined field on the display. However, it cannot replace unrelated essential information. For example, more detailed navigation information cannot be placed in the display area reserved for a different category of information such as speed, altitude, heading, etc.

U.S. patent application US-2003004619 describes a display system adapted for use on a PFD that shows CDI indications (both lateral and vertical) that combine RNP and Actual Navigation Performance (ANP) information. The system described therein uses extensible bars whose outer ends correspond to the RNP limit and whose inner ends are determined by the ANP value relative to the RNP value. The center marker between the bars corresponds to the planned aircraft course. A separate pilot controlled "bug" indicates the current aircraft position relative to the next course. If the current position indicator lies in the space between the extensible bars, the aircraft is operating in a safe region, and if the current position indicator lies on either of the extensible bars, the aircraft is no longer in a safe operating region. While this approach provides more information for operation in an RNP region than, say, the display of FIG. 1 it is less than optimal. Among its limitations are: (i) combining the RNP and ANP information into the extensible bars makes it difficult or impossible for the pilot to estimate whether the potential navigation problem arises from RNP or ANP variations or both since they are not separately presented; (ii) the mode of presentation using the extensible bars is, for some people, more difficult to relate to the spatial geometry of the flight path and the aircraft position; (iii) there are no scale reference markers on the CDI display using the extensible bars so that relative separation of safe and hazardous operating conditions may be harder for some pilots to judge; and (iv) the current position indicator is not correlated on the display with the ANP information.

Accordingly, it is desirable to provide more detailed navigation information for safe operation in restricted airspace, in a manner that is more intuitive and more easily grasped by a pilot, that conveys more clearly a geometric picture related to the actual flight path and navigational limitations. In addition, it is desirable to provide such information in a way that does not interfere with unrelated information already present on the PFD screen. Further, it is desirable to provide such additional navigation information so that it is within the pilot's primary PFD scan area at all times. Still further, it is desirable that the additional information be provided in such a way that the improved display can be retrofitted to existing fleets with minimum system alterations. In addition, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for indicating safe or potentially hazardous operating conditions of an aircraft in a required navigational performance (RNP) environment. The apparatus comprises a course deviation display field with first and second markers defining outer boundaries of the RNP width and a central marker indicating the desired course within the RNP width, an aircraft estimated position uncertainty (EPU) marker in the display field whose size corresponds to the EPU and a current aircraft position marker coupled to the EPU marker and moving therewith as the aircraft position changes with respect to the RNP width. In the preferred embodiment, the display desirably changes color and/or flashes to alert a pilot to a potentially hazardous condition when an outer boundary of the EPU marker approaches to within a predetermined guard-band distance of or overlaps either of the first or second markers. An audible warning can be included.

A method is provided for indicating when a potentially unsafe aircraft operating condition is existent. The method comprises determining a required navigational performance width between first and second outer boundaries thereof, an estimated position uncertainty having third and fourth opposed outer boundaries in a first direction substantially parallel to the required navigational performance width, and a current course deviation between actual and planned position in the first direction, presenting the required navigational performance width, the estimated position uncertainty and the current course deviation on a display, wherein the required navigational performance width and the estimated position uncertainty are shown separately in the same field, and when either of the third or fourth boundaries approaches within a predetermined guard-band of or overlaps either of the first or second boundaries, announcing optically, audibly or both that a potentially hazardous condition has occurred.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 2:
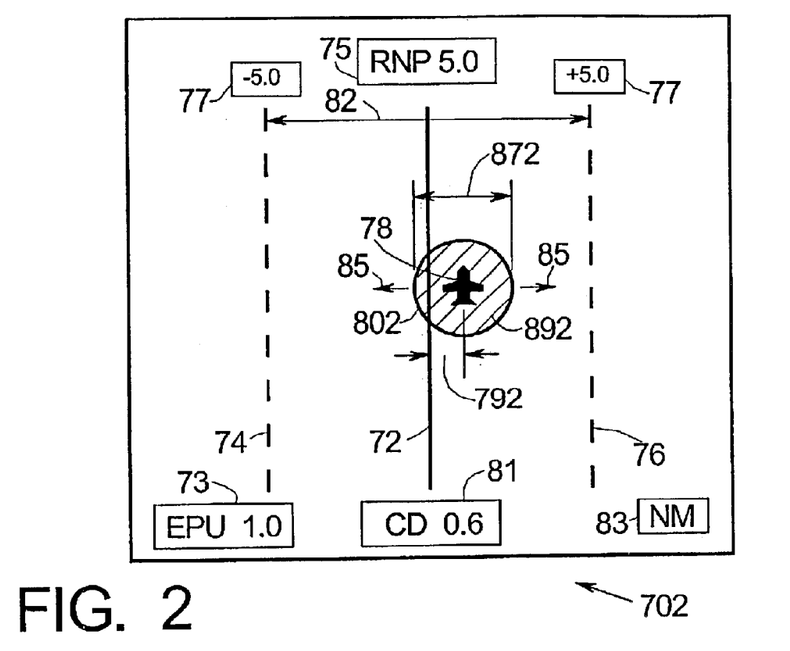
FIG. 2 is a simplified schematic display of the navigational situation in an RNP environment according a first embodiment of the present invention for a first set of values of RNP, EPU and Course Deviation (CD) illustrating a safe navigation situation.

FIG. 2 is a schematic presentation of display 702 showing RNP, EPU and course deviation (CD) information separately and in a graphical way that intuitively resembles the actual geometry of the flight path situation. Central line 72 represents the planned aircraft course (PAC). Parallel, spaced-apart lines 74, 76 show the RNP boundaries separated by distance 82 corresponding to twice the RNP value. The RNP value is conveniently displayed in boxes 75, 77. In this example RNP is ±5.0 nautical miles (NM). Small aircraft symbol 78 shows the actual aircraft position relative to the RNP boundaries and PAC 72. In this example, aircraft symbol 78 is to the right of PAC 72 by CD amount 792 also shown in box 81, e.g., course deviation CD=0.6 NM. Circular marker 802 surrounding aircraft symbol 78 is the EPU range in units of RNP. In this example, diameter 872 for EPU 802 represents ±1.0 NM. The EPU value is conveniently provided as shown in box 73, but this is not essential.

Figure 3:
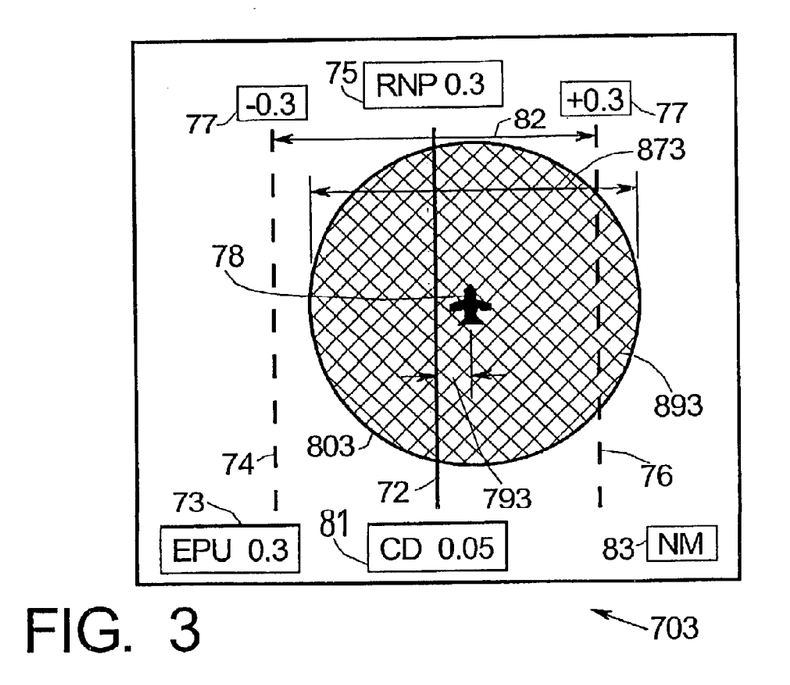
FIG. 3 is a simplified schematic display similar to FIG. 2, but for a second set of values of RNP, EPU and CD illustrating a potentially hazardous navigation situation.

In the display of FIGS. 2–3, PAC line 72 and RNP boundary lines 74, 76 are stationary independent of the RNP value, and separation 82 remains constant on displays 702, 703 irrespective of the actual RNP value shown in boxes 75, 77. Plane symbol 78 and EPU circles or markers 802, 803 move laterally in unison, as shown by arrows 85, and diameters 872, 873 of EPU markers 802, 803 change as the aircraft operating conditions and/or the navigational circumstances change. On FIGS. 2–3, the size of EPU marker 802, 803 is represented as a ratio of the RNP value, that is, as a fraction of RNP separation distance 82. For example, in FIG. 3 where EPU and RNP represent the same value (e.g., 0.3 NM), diameter 873 equals spacing 82 between RNP lines 74, 76.

It is convenient to use a color display. PAC line 72 and aircraft symbol 78 are preferably white, although other colors (e.g., color-1) can also be used. RNP boundaries 74, 76 are preferable amber, although other colors (e.g., color-2 different than color-1) can be used. In FIG. 2, EPU marker 802 is within RNP boundaries 74, 76 indicating a safe operating condition. Under these "safe" conditions, EPU marker 802 is conveniently green (e.g., color-3 different than color-1 and color-2). It is preferable that EPU marker 802 be solidly color-3 (e.g., green) and not merely a colored outline, but this is not essential. For example, the user may desire that EPU circle 802 for a "safe" condition be shown merely as an outline rather than a solid circle. The solid color-3 condition is represented by single hatching 892. Since aircraft symbol 78 is always within EPU circle or marker 802, 803 it desirably shows color-1 (e.g., white) against color-3 (e.g. green), i.e., the background color of EPU marker 802 under the conditions of FIG. 2. This arrangement increases the visibility of EPU marker 802, 803 relative to RNP boundaries 74, 76, so that even when viewed peripherally rather than directly, the display can alert the pilot to whether the aircraft is in a safe or potentially hazardous navigational situation.

FIG. 3 shows display 703 similar to display 702 of FIG. 2, but with different operating conditions. Like reference numbers are used to refer to like areas or symbols on the display. The RNP, EPU and CD values in FIG. 3 are different than in FIG. 2. In the example of FIG. 3, RNP=±0.3 NM, CD=0.05 NM and EPU=±0.3 NM. Aircraft symbol 78 and course maker 72 remain color-1 (e.g., white) and RNP boundaries 74, 76 remain color-2 (e.g., amber). But now, EPU marker 803 overlaps RNP boundary 76 indicating that a potential hazard condition exists, so EPU marker 803 changes to color-2 (e.g., amber) or color-4 (e.g., red). It is especially desirable in this situation that marker 803 be a solid color (except for aircraft symbol 78 at its center) so that the existence of a potential hazard situation is immediately apparent even to the peripheral vision of the pilot. To enhance the visibility, it is preferred that marker 803 pulse or flash under any circumstance where display 703 (or equivalent) is indicating a potentially hazardous situation. Those of skill in the art will appreciate that many different colors can be used to represent a safe or hazardous condition, and the present invention is not intended to be limited to the examples mentioned herein. What is important is that when EPU marker 802, 803 overlaps or closely approaches either RNP boundary 74 or 76, that a prominent and easily distinguished color be used so that it catches the pilots eye and readily conveys by the color itself if possible, the message, "Hazard Warning" so that the pilot is prompted to look more closely at the display. Persons of skill in the art will know which colors are most suitable for colors 1–4. While EPU markers 802, 803 is shown in FIGS. 2–3 as having a circular shape, this is merely for convenience of explanation and not intended to be limiting. Persons of skill in the art will understand that the actual EPU shape may not be circular but oval or polygonal or some other shape, and that markers 802, 803 can display such shapes. What is important is that the lateral dimensions of EPU markers 802, 803 correspond to the lateral estimated position uncertainty of the aircraft.

While the displays illustrated in FIGS. 2–3 are very clear and easily grasped by the pilot, they must be presented on a separate screen since there is not sufficient space on existing PFD screens (e.g., see FIG. 1). Accordingly, the arrangement of FIGS. 2–3 is modified to fit in available spaces on a PFD screen while still preserving many of the advantages of the type of display in FIGS. 2–3. This is illustrated in FIG. 4.

Figure 4:
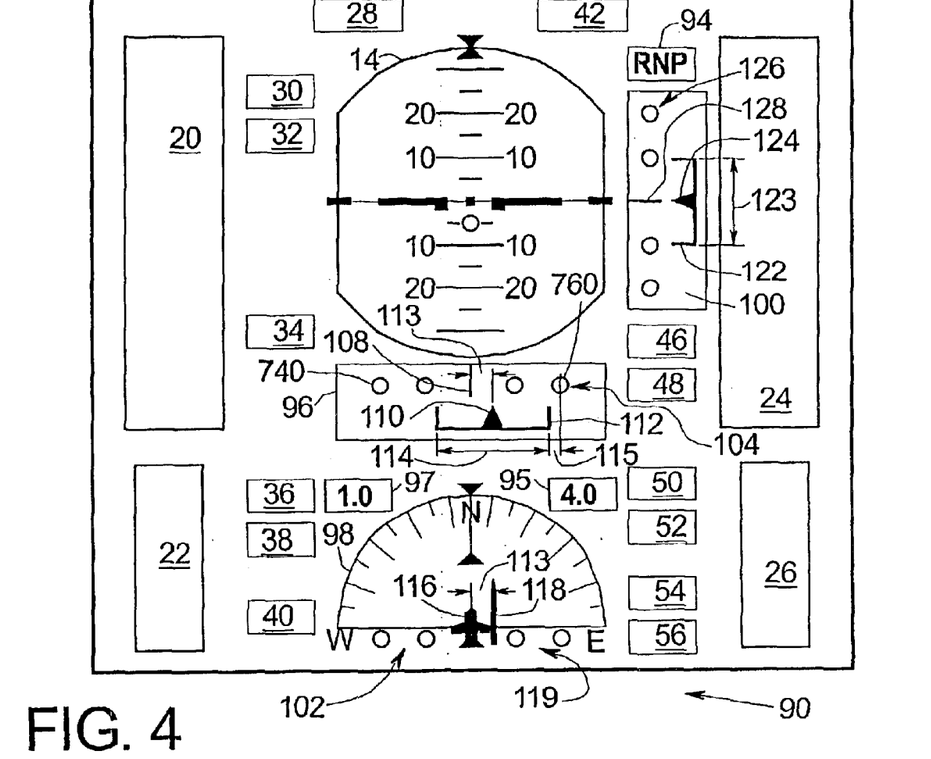
FIG. 4 is a view of a PFD similar to FIG. 1, but according to a further embodiment of the present invention.

FIG. 4 is a view similar to FIG. 1 of PFD 90 according to a further embodiment of the present invention. Like reference numbers are used to refer to like areas on FIGS. 1 and 4. What is different between FIGS. 1 and 4 are CDI areas 96, 100, compass rose (CR) 98, area 102 below CR 98 and RNP value screen areas 94, 95 and CD value screen area 97. Area 94 illuminates with the legend "RNP" when RNP conditions exist. Area 95 optionally gives the current RNP value, for example, "5.0" nautical miles or "5.0 NM", the "±" being understood by the user. Area 97 gives the current course deviation (CD) value, e.g., 1.0 NM. FIG. 4 gives an overview of the integration of the display information provided by the present invention with the remainder of the information provided on PFD 90. A more detailed understanding of what the symbols shown in areas 96, 98, 100, 102 represent is provided through reference to FIGS. 5–14.

FIGS. 5–9 concern lateral course deviation information and are views of portions 96, 98, 102 of PFD 90 of FIG. 4 under different operating conditions. In FIGS. 5–9, CDI indicator 96, CR 98 and area 102 below CR 98 are shown for different combinations of RNP, EPU and CD. Referring now to FIGS. 5–9, lateral distance marks 104 are provided in CDI region 96 with maximal separation distance 106 corresponding to the current RNP value. Outer boundary markers 740, 760 correspond to boundary lines 74, 76 of FIGS. 2–3. The actual screen separation distance 106 does not change for different RNP values, but the amount of physical distance it represents is determined by the RNP value obtained from the navigation database in the flight management system (FMS). RNP values may also be manually entered by the operator. RNP values for different locations along the planned flight path are known and stored in the FMS driving PFD 90. RNP values for different flight paths are provided by the Federal Aviation Administration (FAA) or equivalent governing body for any restricted airspace. Central mark 108 in CDI area 96 is the planned flight path location. The RNP value determines the allowable deviation from the planned flight path. Mark 108 remains stationary and width 106 remains constant on PFD 90 irrespective of the actual RNP value represented. Thus CDI display 96 is a relative distance display, where the separation between indicators 104 are, for example, in units of one-half of the current RNP value. For example, for an RNP of ±5 NM, width 106 is 10 NM and each scale marker 104 represents approximately 2.5 NM. By adding more scale markers 104, finer gradations can be displayed. As RNP increases, width 106 represents more miles or kilometers and as RNP shrinks, width 106 represents fewer miles or kilometers.

The estimated aircraft position is indicated by mark 110. However for safe operation, the estimated aircraft position by itself is not sufficient. The estimated position uncertainty (EPU) must also be taken into account. The EPU value is represented by brackets or winglets 112, usually centered on estimated position mark 110 (but not necessarily so—see FIG. 12), with width 114 in FIG. 4 or widths 1145–1149 in FIGS. 5–9 representing the EPU value in RNP units. CDI display 96 is a relative display, that is, width 114 or 1145–1149 is represented in RNP units. For example, if RNP is ±5 KM then width 106 corresponds to 10 KM and if EPU is ±2 KM (total EPU distance 4 KM) then width 114 is forty percent of width 106. If the RNP drops to ±2 KM, then width 114 will be equal to width 106. Separation 113 between course mark 108 and position mark 110 is the current course deviation (CD). CD 113 is also represented in RNP units. The representation shown in FIGS. 4–9 conveys substantially the same information about lateral navigation safety as screens 702, 703 of FIGS. 2–3 but in a much more compact form suitable for inclusion in PFD 90. With respect to variable distances or widths in FIGS. 5–9 the convention is followed herein of identifying the particular values in the different figures by including the figure number in the corresponding reference number shown in FIG. 4. Thus, width 114 in FIG. 4 is correspondingly identified as 1145, 1146, 1147, 1148, 1149 respectively in FIGS. 5–9. The same convention applies to widths or distances 1136–1138 in FIGS. 6–8 and 1156–1159 in FIGS. 5–9.

Figure 5:
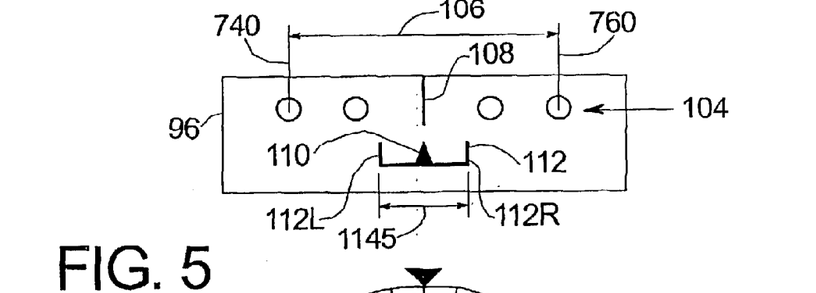
FIGS. 5–9 are views of a portion of the display of FIG. 4 related to lateral navigation under different operating conditions.

Mark 110 and brackets or winglets 112 in CDI region 96 and course marker 118 in CR region 98 move laterally back and forth as the location of the aircraft relative to flight path 108 changes. In FIG. 5 for example, the aircraft is nominally on the flight path (i.e., CD=0), but brackets or winglets 112 show that the actual aircraft position may be anywhere within brackets 112, that is within EPU distance 1145. In FIGS. 4–5 EPU width 114, 1145 is significantly less than RNP width 116 and CD 113 is small so that brackets or winglets 112 lie well within outermost RNP boundaries 740, 760 and the aircraft is operating safely. Persons of skill in the art will understand based upon the description herein that when the EPU is very much smaller than the RNP (e.g., EPU=0.05 and RNP=10), that brackets or winglets 112 can disappear into aircraft position marker 110. Even under these conditions, it will be apparent to the pilot or other user that the aircraft is in a "safe" operating condition where CD indicator 110 is still within RNP boundaries 740, 760.

Further pilot-aide information is provided on CR 98 and in region 102 at the bottom of CR 98. In CR 98, small plane-shaped indicator symbol 116 is provided at the center point of the half-circle of CR 98. It represents the actual aircraft position but is positionally correlated on PFD 90 to mark 108 of CDI 96. Symbol 116 does not move on PFD 90. Pencil-shaped flight path or course indicator 118 on CR 98 is the programmed flight path relative to the current aircraft location, and is correlated with mark 110 of CDI 96. In FIG. 5, since marks 108, 110 are coincident (CD=0), symbol 116 and flight path indicator 118 are coincident. Display portion 102 at the bottom of CR 98 immediately tells the pilot which way to turn to return to the programmed flight path. For example, in FIG. 4, the pilot would turn right to return to the programmed flight path. Scale markers 119 in region 102 are correlated with scale markers 104 in CDI area 96 and outer markers 741, 761 correspond to outer markers 740, 760 respectively. The same scale applies to scale markers 104 and 119.

Figure 6:
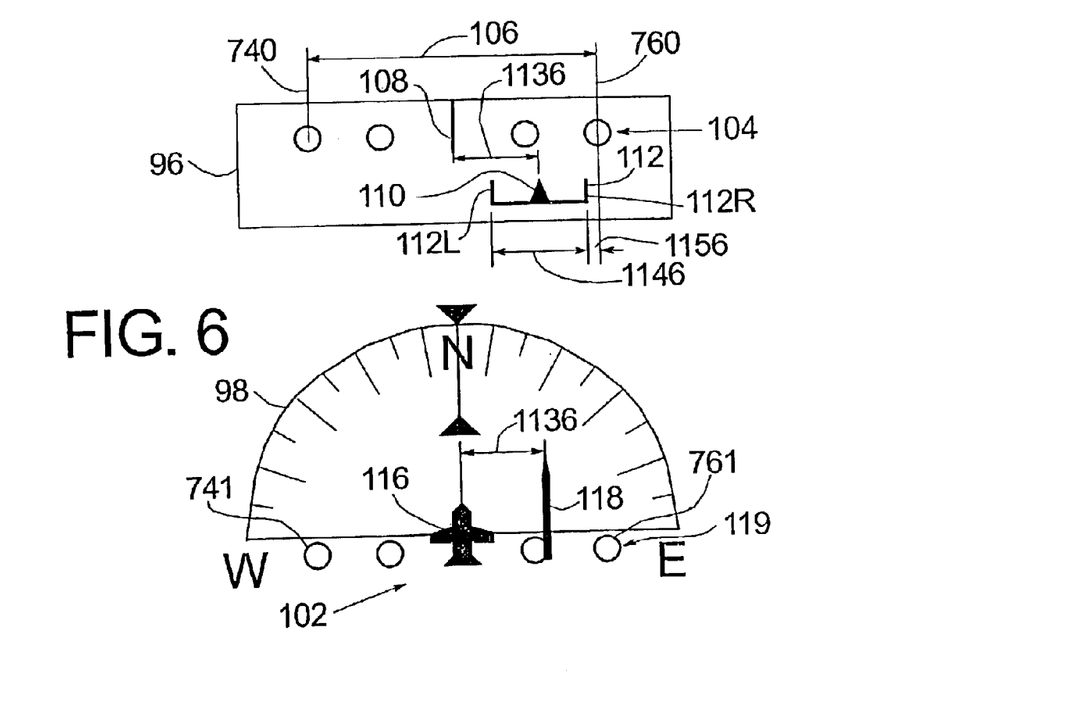

FIG. 5 shows the situation where EPU<RNP and CD=0. Winglet 112 lies entirely within RNP width 106 between RNP boundaries 740, 760. This is a safe operating condition. In FIG. 6, EPU winglet width 1146 is substantially the same as width 1145 in FIG. 5, but CD 1136 has increased significantly. Right hand edge 112R of EPU winglet 112 has now approached to within distance 1156 of right-hand RNP boundary 760, but still inside boundary 760. Whether or not this is sufficient to cause a hazard warning (e.g., color change, flashing symbols, audible alarms, or a combination thereof) depends on whether or not a guard-band has been provided. Since width 114 for example is a probabalistic determination corresponding to a predetermined confidence level (e.g., the aircraft will be within winglet 112 ninety-five percent of the time), it is often desirable to add a further margin of safety. This is conveniently done by setting a guard-band. For example, if either end of winglet 112 is within X % of RNP boundary 740, 760 or within Y NM (or KM) of boundary 740, 760, then a Potential Hazard warning response is given. If X=Y=0, then there is no guard-band. Useful values of X are, for example, 1% to 5% with about 5% being preferred. Persons of skill in the art will understand how to select X and/or Y guard-bands of appropriate size for the anticipated operating conditions and flight situation expected to be encountered.

Figure 7:
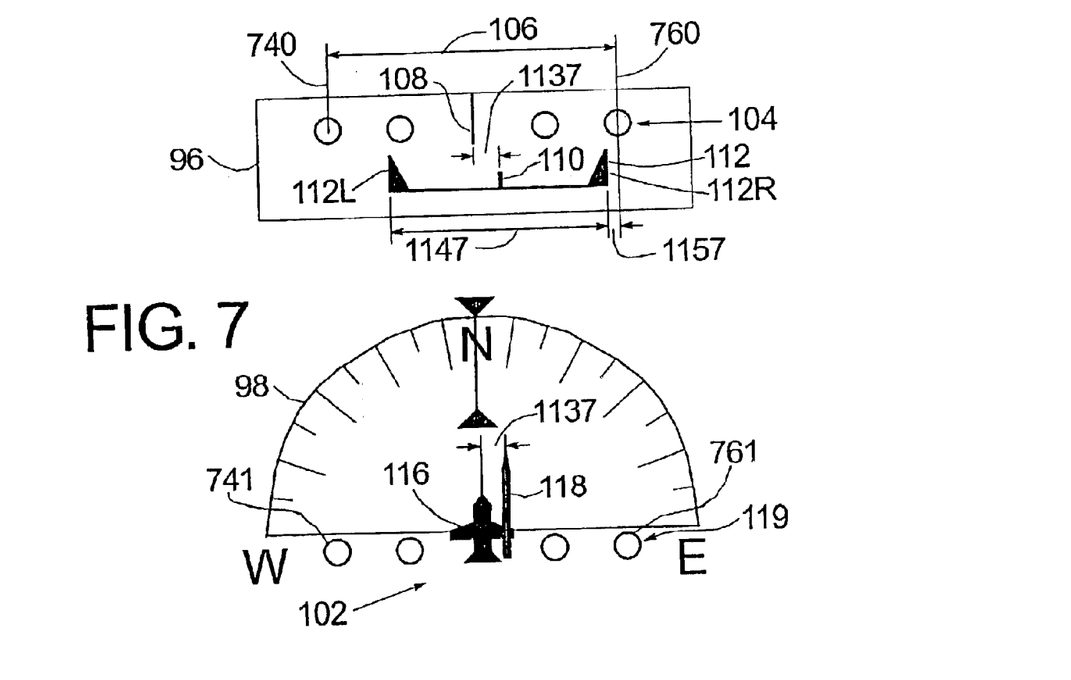

FIG. 7 shows a situation where the EPU value has increased relative to the RNP value causing winglet width 1147 to increase in size, compared to width 1146 in FIG. 6. CD 1137 is however much less than in FIG. 6 so that distance 1157 between right-hand edge 112R of winglet 112 and RNP boundary marker 760 is still about the same as distance 1156 in FIG. 6 and the same considerations relative to use of a guard-band and a Potential Hazard warning apply.

Figure 8:
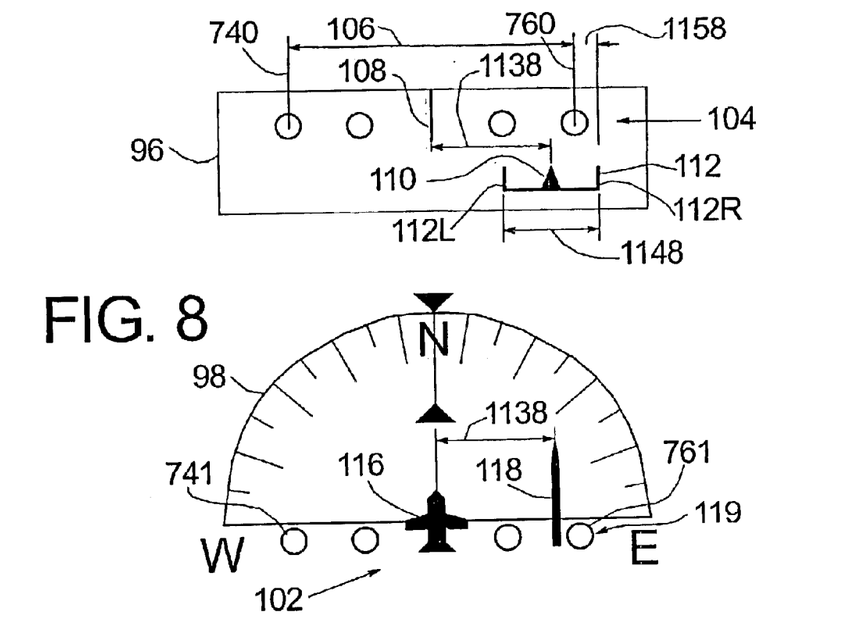

FIG. 8 illustrates a situation where EPU width 1148 is still relatively small but CD 1138 has become large so that right hand boundary 112R of EPU winglet 112 is now beyond right hand RNP boundary 760 by amount 1158. This represents a Potential Hazard warning situation and alarm provisions such as those discussed above (color change, flashing symbols, audible alarm, or a combination thereof) are warranted.

Figure 9:
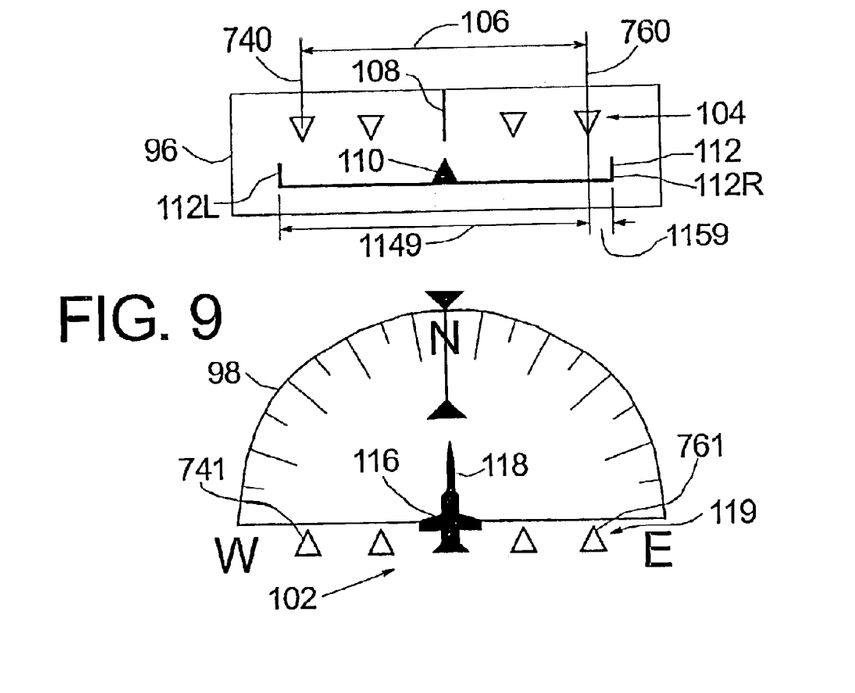

FIG. 9 illustrates a further combination of events where CD is zero but width 1149 of EPU winglet 112 has increased to exceed RNP width 106 by amount 1159. Both left and right-hand boundaries 112L, 112R of EPU-winglet 112 lie outside RNP boundaries 740, 760 respectively and a Potential Hazard warning is appropriate. Persons of skill in the art will understand that many different combinations of RNP, EPU and CD values can be encountered and that the display arrangement described above is suitable to give a simple visual indication of whether a safe or potentially hazardous condition has been encountered.

It will be noted in connection with FIGS. 4–9 that planned course indicator 118 in CR 98 moves in synchronism with current position indicator 110 in CDI 96. It will also be noted that various shaped winglets may be used for actual course and EPU markers 110, 112. For example, In FIGS. 4–6, 8–9 position marker 110 is represented by an upward pointing triangle and EPU winglet 112 is represented by an approximately U-shaped or cup-shaped symbol with vertical lines at its extremities 112L and 112R. In FIG. 7, position marker 110 is represented by a vertical line and EPU winglet 112 is represented by an approximately U-shaped or cup-shaped symbol with right triangles at its extremities 112L and 112R. Persons of skill in the art will understand based on the description herein that any suitably shaped symbols 110, 112 that conveys the actual aircraft location and EPU can be used in place of those illustrated herein. It will also be noted that in FIG. 9, RNP scale markers 104, 119 are in the shape of triangles rather than round markers as used in FIGS. 4–8. Either arrangement is useful and persons of skill in the art will understand that the present invention does not depend upon the shape of the scale markers used in CDI 96 or CR 98. The above comments also apply to vertical path deviation area 100 (see FIGS. 4 and 10–14) with respect to the shape of the RNP scale markers, PAC marker, the EPU winglets and current position indicators.

Figure 10:
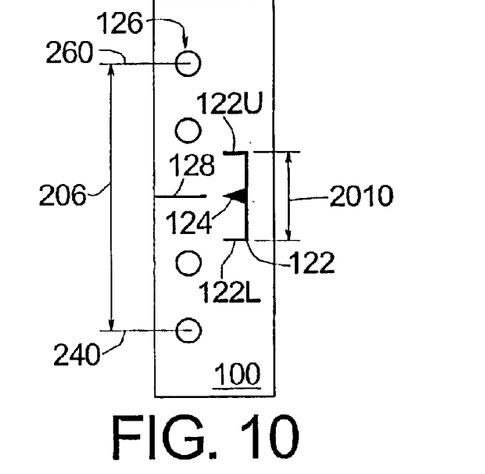
FIGS. 10–14 are views of a portion of the display of FIG. 4, analogous to FIGS. 5–9 but related to vertical navigation under different operating conditions.
Figure 11:
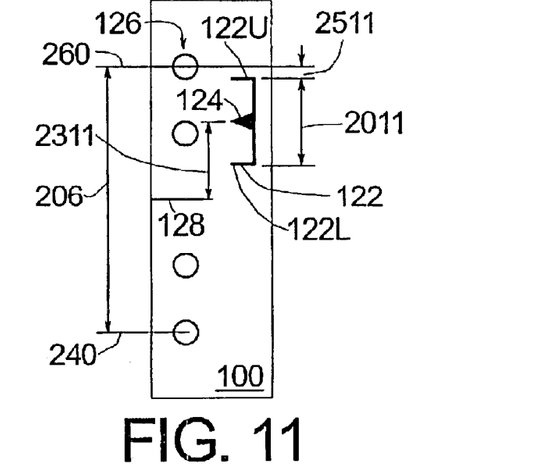
Figures 12, 13, 14:
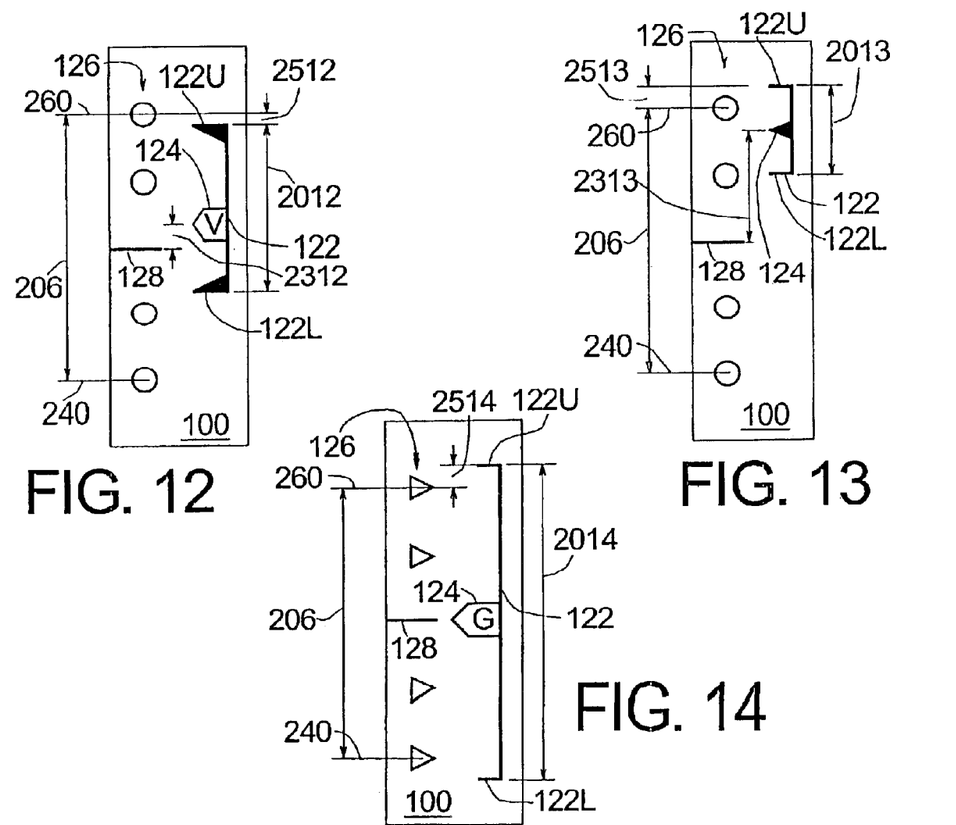

FIGS. 10–14 are views of Vertical Path Deviation Indicator (VPDI) portion 100 of display 90 of FIG. 4 under different operating conditions. For convenience of explanation, VPDI portion 100 is also referred to as Course Deviation Indicator (CDI) 100 and the abbreviation CDI is intended to include the meaning Vertical Path Deviation Indicator. The operating conditions in FIGS. 10–14 are analogous to the operating conditions in FIGS. 5–9, respectively, but in the vertical plane. Scale markers 126 show the vertical RNP channel that the aircraft must operate in, with upper limit 260, lower limit 240 and vertical RNP width 206. These are analogous to scale markers 104, right limit 760, left limit 740 and lateral RNP width 106 of FIGS. 5–9. EPU winglets 122 of varying widths 2010, 2011, 2012, 2013, 2014 in FIGS. 10–14 are analogous to winglets 112 of varying widths 1145, 1146, 1147, 1148, 1149 in FIGS. 5–9, respectively. Vertical Path Deviation (VPD) amounts 2311, 2312, 2313 in FIGS. 11–13 are analogous to CD amounts 1136, 1137, 1138 in FIGS. 6–8, respectively. For convenience of explanation, Vertical Path Deviation (VPD) is also referred to as Course Deviation (CD) and the abbreviation CD is intended to include the meaning Vertical Path Deviation.

In FIG. 10, vertical CD is zero and width 2010 of vertical EPU winglet 122 is significantly smaller than width 206 of the vertical RNP path. Winglet 122 lies entirely between RNP boundaries 240, 260, indicating a safe operating condition. In FIG. 11 as in FIG. 6, winglet width 2011 is substantially the same as width 2010 of FIG. 10, but a large CD has developed of amount 2311 bringing upper EPU winglet boundary 122U within distance 2511 of upper RNP boundary 260. The same discussion given in connection with FIG. 6 concerning a guard-band applies to the situation of FIG. 11 and is incorporated herein by reference.

In FIG. 12 as in FIG. 7, CD amount 2312 is small but width 2012 of EPU winglet 122 has expanded, again resulting in upper end 122U of winglet 122 being within distance 2512 of upper RNP boundary 260, and the same guard-band comments previously given can also apply in this situation. FIG. 12 also illustrates another feature of the present invention, that is, that aircraft position indicator 124 need not be located symmetrically within EPU winglet 122, as it is in previous examples. Under certain conditions well known in the art the EPU space 114, 123 (see FIG. 4) may not extend symmetrically to left and right or up and down around current position markers 110, 124. Therefore, presenting EPU winglets that reflect the EPU asymmetry determined by the FMS is an important advantage of the present invention. FIG. 12 also illustrates a further embodiment of the present invention, wherein the aircraft position marker, hitherto a line or triangle has been replaced by a polygon containing the letter "V" indicating that VNAV conditions are in effect. VNAV means that the vertical path and guidance are associated with and computed by the FMS. Similarly, in FIG. 14, a similar polygon appears but with a "G" inside, indicating that glide-slope conditions are in effect as associated with a precision Instrument Landing System (ILS) using a specific radio receiver. Thus, the displays of the present invention can convey valuable additional information to the pilot.

FIG. 13 illustrates the condition where EPU winglet 122 has width 2013 that is smaller than RNP width 206, but because of large CD distance 2313, upper boundary 122U of EPU winglet 122 lies outside upper RNP boundary 260. This is a Potential Hazard condition and appropriate warning should result. FIG. 14 shows the situation where EPU width 2014 has expanded to exceed RNP width 206 (or RNP has shrunk to be less than EPU) and both upper and lower boundaries 122U, 122L of EPU winglet 122 lie outside RNP boundaries 260, 240. This is also a Potential Hazard condition and appropriate warning results.

As previously discussed, appropriate warnings can be a change in color of the EPU winglet and other symbols, flashing of the EPU winglet and other symbols, an audible alarm or a combination of such. Based on the description herein, persons of skill in the art will conceive of other means of providing warning of the Potential Hazard condition. Those discussed in connection with the lateral CDI 96 also apply to the vertical CDI 100.

A method is described for indicating when a potentially unsafe aircraft operating condition is existent. The method comprises: determining first and second outer boundaries of the RNP; determining third and fourth opposed outer boundaries of the EPU in a first direction substantially parallel to the RNP width; and determining a current deviation between actual and planned position, in any order. Then, presenting the RNP width, the EPU width and the current CD on a display, wherein the RNP width and the EPU width are shown separately in the same field. Then, when either of the third or fourth boundaries approaches within a predetermined guard-band of or overlaps either of the first or second boundaries, announcing optically, audibly or both that a potential hazard condition is occurring. In a preferred embodiment, the presenting step comprises presenting the CD by showing a planned path or course marker within the first and second boundaries and showing an actual aircraft position marker within the third and fourth boundaries, and moving the actual aircraft position marker and the third and fourth boundaries in unison as the aircraft operating conditions change. It is further desirable that the presenting step comprises showing the RNP width by multiple fixed scale markers, e.g., more than two scale markers, whose outermost members comprise the first and second boundaries, and showing the EPU size in the form of a winglet whose wingtips correspond to the third and fourth boundaries. As used herein, the words "course" and "path" are used synonimously to refer to an aircraft track in space, planned or actual.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight display for aircraft comprising:
   a course deviation indicator display field with first and second markers defining outer boundaries of a required navigational performance width and having a central marker indicating the desired course within the required navigational performance width;
   an aircraft estimated position uncertainty marker in the display field whose size corresponds to the estimated position uncertainty; and
   a current aircraft position marker coupled to the estimated position uncertainty marker and moving therewith as the aircraft position changes with respect to the required navigational performance width.

2. The display of claim 1 further comprising an alarm means, wherein the alarm means alerts a pilot when an outer boundary of the expected performance uncertainty marker approaches to within a predetermined guard-band amount of either of the first or second markers or lies outside either of the first or second markers.

3. The display of claim 2 wherein the alarm means includes changing a color of the expected performance uncertainty marker to a color suggestive of a Hazard Warning.

4. The display of claim 2 wherein the alarm means includes causing the estimated position uncertainty marker or required navigation performance markers or both to flash on and off.

5. The display of claim 2 wherein the alarm means includes an audible alarm.

6. The display of claim 1 further comprising an alarm means, wherein the alarm means alerts a pilot when an outer boundary of the expected performance uncertainty marker impinges on or crosses over either of the first or second markers.

7. The display of claim 1 wherein the estimated position uncertainty marker has a winglet shape with a wingspan corresponding to the size of the expected performance uncertainty.

8. The display of claim 1 wherein a distance between the first and second markers on the display is fixed independent of the size of the required navigational performance width.

9. The display of claim 8 wherein the size of the estimated position uncertainty marker is shown on the display in relation to the required navigational performance width.

10. The display of claim 1 further comprising a field that indicates when illuminated, that required navigational performance operating conditions are existent.

11. The display of claim 1 further comprising a field that numerically shows the required navigational performance width.

12. The display of claim 1 further comprising a field that numerically shows the estimated position uncertainty.

13. The display of claim 1 further comprising a second course deviation indicator display field comprising a second required navigational performance width, second aircraft estimated position uncertainty markers and second current aircraft position maker, the combination indicating vertical course deviation.

14. A method for indicating when a potentially unsafe aircraft operating condition is existent, comprising:

determining a required navigational performance width between first and second outer boundaries thereof, an estimated position uncertainty having third and fourth opposed outer boundaries in a first direction substantially parallel to the required navigational performance width, and a current course deviation between actual and planned position in the first direction;

presenting the required navigational performance width, the estimated position uncertainty and the current course deviation on a display, wherein the required navigational performance width and the estimated position uncertainty are shown separately in the same field; and when either of the third or fourth boundaries approaches within a predetermined guard-band of or overlaps either of the first or second boundaries, announcing optically, audibly or both that a potentially hazardous condition has occurred.

15. The method of claim 14 wherein the presenting step comprises presenting the course deviation by showing a planned course marker within the first and second boundaries and showing an actual aircraft position marker within the third and fourth boundaries, and moving the actual aircraft position marker and the third and fourth boundaries in unison as the aircraft operating conditions change.

16. The method of claim 14 wherein the presenting step comprises showing the required navigational width by fixed scale markers whose outermost members comprise the first and second boundaries, and showing the estimated position uncertainty in the form of a winglet whose wingtips correspond to the third and fourth boundaries.

17. A display for indicating safe or potentially hazardous operation of an aircraft, comprising:

scale markers distributed in a first direction, whose outermost members indicate a required navigation performance width within which it is desired that the aircraft operate and which contains an indicator showing the planned position of the aircraft with respect to the required navigational performance width;

a variable size marker whose extent between outer boundaries in the first direction indicates an estimated position uncertainty of the aircraft with respect to its actual position and which contains a current position marker, wherein both move in unison in the first direction as the actual aircraft position varies with respect to it planned position; and annunciator means indicating a change from safe to potentially hazardous operating conditions when either outer boundary of the variable size marker encroaches within a predetermined guard-band distance of either outermost member of the required navigational performance scale markers or lies outside of either of the outermost members.

18. The display of claim 17 wherein the annunciator means indicates a safe operating condition when either outer boundary of the variable size marker does not so encroach or lie outside.

* * * * *